(12) United States Patent
Cheng et al.

(10) Patent No.: US 9,561,774 B2
(45) Date of Patent: Feb. 7, 2017

(54) WINGED DRIVER AIRBAG

(71) Applicant: FORD GLOBAL TECHNOLOGIES, LLC, Dearborn, MI (US)

(72) Inventors: James Chih Cheng, Troy, MI (US); Dean M. Jaradi, Macomb, MI (US); Mohammed Omar Faruque, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/260,583

(22) Filed: Apr. 24, 2014

(65) Prior Publication Data

US 2015/0307055 A1   Oct. 29, 2015

(51) Int. Cl.
   *B60R 21/2334*   (2011.01)
   *B60R 21/233*   (2006.01)
   (Continued)

(52) U.S. Cl.
   CPC .......... *B60R 21/233* (2013.01); *B60R 21/203* (2013.01); *B60R 21/239* (2013.01);
   (Continued)

(58) Field of Classification Search
   CPC ............... B60R 21/231; B60R 21/2342; B60R 21/2338; B60R 2021/23382; B60R 2021/0048; B60R 21/233; B60R 2021/23316; B60R 2021/23324; B60R 2021/23332
   (Continued)

(56) References Cited

U.S. PATENT DOCUMENTS

| 5,022,675 A | 6/1991 | Zelenak, Jr. et al. |
| 5,044,663 A | 9/1991 | Seizert |

(Continued)

FOREIGN PATENT DOCUMENTS

| CA | 2361732 A1 | 4/2003 |
| DE | 102004011369 A1 | 3/2004 |

(Continued)

OTHER PUBLICATIONS

Non-Final Office Action mailed Oct. 6, 2014 in U.S. Appl. No. 14/260,680, filed Apr. 24, 2014.
(Continued)

*Primary Examiner* — James English
(74) *Attorney, Agent, or Firm* — Frank A. MacKenzie; Brooks Kushman P.C.

(57) ABSTRACT

A vehicle includes a steering wheel having a steering wheel cover and an airbag module. The airbag module includes an airbag arrangement and an inflator disposed behind the steering wheel cover. The inflator is configured to inflate the airbag arrangement. The airbag arrangement has a primary bag configured to cushion an occupant and a secondary bag disposed on a side of the primary bag adjacent to a driver's side of the vehicle. The secondary bag is configured to catch an occupant during impact of the vehicle. The airbag arrangement further includes a patch having a seam. The patch partitions the primary and secondary bags. The seam is configured to split when a pressure in the primary bag exceeds a threshold allowing gas to inflate the secondary bag.

9 Claims, 2 Drawing Sheets

(51) Int. Cl.
*B60R 21/203* (2006.01)
*B60R 21/239* (2006.01)
*B60R 21/2338* (2011.01)
*B60R 21/00* (2006.01)

(52) U.S. Cl.
CPC ............ *B60R 2021/0009* (2013.01); *B60R 2021/23308* (2013.01); *B60R 2021/23316* (2013.01); *B60R 2021/23382* (2013.01)

(58) Field of Classification Search
USPC ................................. 280/731, 743.1, 743.2
See application file for complete search history.

(56) References Cited

U.S. PATENT DOCUMENTS

| | | | |
|---|---|---|---|
| 5,213,361 A | 5/1993 | Satoh et al. | |
| 5,219,179 A * | 6/1993 | Eyrainer et al. | 280/739 |
| 5,380,038 A | 1/1995 | Hawthorn et al. | |
| 5,529,337 A * | 6/1996 | Takeda | B60R 21/233 280/729 |
| 6,254,130 B1 | 7/2001 | Jayaraman et al. | |
| 6,419,262 B1 * | 7/2002 | Fendt et al. | 280/729 |
| 6,550,804 B2 * | 4/2003 | Burdock | 280/731 |
| 6,554,313 B2 * | 4/2003 | Uchida | 280/729 |
| 6,616,184 B2 | 9/2003 | Fischer | |
| 6,962,363 B2 | 11/2005 | Wang | |
| 6,981,719 B2 | 1/2006 | Igawa | |
| 7,334,812 B2 | 2/2008 | Abe | |
| 7,377,548 B2 | 5/2008 | Bauer et al. | |
| 7,571,931 B2 | 8/2009 | Watanabe | |
| 7,631,891 B2 * | 12/2009 | Washino | 280/731 |
| 7,654,561 B2 * | 2/2010 | Webber et al. | 280/729 |
| 7,681,909 B2 * | 3/2010 | Idomoto et al. | 280/729 |
| 8,215,671 B2 | 7/2012 | Bergstrom et al. | |
| 8,419,053 B2 | 4/2013 | Ahn | |
| 8,544,882 B2 | 10/2013 | Gulde et al. | |
| 8,876,153 B2 * | 11/2014 | Dix | 280/729 |
| 8,882,143 B2 * | 11/2014 | Williams et al. | 280/739 |
| 2003/0116945 A1 * | 6/2003 | Abe | 280/729 |
| 2005/0098985 A1 * | 5/2005 | Sullivan et al. | 280/729 |
| 2005/0098994 A1 | 5/2005 | Matsumura | |
| 2005/0110257 A1 | 5/2005 | Cohen | |
| 2006/0103118 A1 | 5/2006 | Hasebe | |
| 2006/0131845 A1 * | 6/2006 | Belwafa et al. | 280/729 |
| 2006/0163848 A1 | 7/2006 | Abe | |
| 2006/0186656 A1 | 8/2006 | Kumagai | |
| 2006/0197324 A1 * | 9/2006 | Klinkenberger | 280/731 |
| 2009/0121462 A1 * | 5/2009 | Rick | 280/729 |
| 2009/0179404 A1 | 7/2009 | Peyre et al. | |
| 2011/0175334 A1 * | 7/2011 | Miller et al. | 280/730.2 |
| 2013/0001934 A1 * | 1/2013 | Nagasawa et al. | 280/731 |
| 2013/0001936 A1 * | 1/2013 | Nagasawa et al. | 280/731 |
| 2013/0087995 A1 * | 4/2013 | Lee et al. | 280/728.2 |
| 2015/0158452 A1 * | 6/2015 | Choi | B60R 21/233 280/732 |
| 2015/0298643 A1 * | 10/2015 | Schneider | B60R 21/233 280/729 |

FOREIGN PATENT DOCUMENTS

| | | |
|---|---|---|
| EP | 1439096 A1 | 7/2004 |
| GB | 2415665 A | 1/2006 |
| JP | 02303951 A | 12/1990 |
| JP | 03032956 A | 3/1991 |
| JP | 08324373 A | 12/1996 |
| JP | 2006088856 A | 6/2006 |
| JP | 2006256508 A | 9/2006 |
| JP | 2009214872 A | 9/2009 |
| JP | 2010241241 A | 10/2010 |
| KR | 20120043551 | 5/2012 |

OTHER PUBLICATIONS

Final Office Action mailed Mar. 2, 2015 in U.S. Appl. No. 14/260,680, filed Apr. 24, 2014.

Sherwood, Chris, "An Update on the IIHS Small Overlap Research Program", SAE International, 2012 Government/Industry Meeting, Jan. 25, 2012, Washington, DC, Insurance Institute for Highway Safety, Highway Loss Data Institute.

* cited by examiner

WINGED DRIVER AIRBAG

TECHNICAL FIELD

The present application relates to driver side airbags for vehicles.

BACKGROUND

Traditionally, airbags are deployed upon impact. Airbags fill with gas and cushion vehicle occupants as they are displaced within the vehicle. They are also designed to absorb energy generated by the displacement of the occupants.

SUMMARY

A vehicle includes a steering wheel having a steering wheel cover and an airbag module. The airbag module includes an airbag arrangement and an inflator disposed behind the steering wheel cover. The airbag arrangement has a primary bag configured to cushion an occupant and a secondary bag disposed on a side of the primary bag adjacent to a driver's side of the vehicle. The secondary bag is configured to catch an occupant during impact of the vehicle. The airbag arrangement further includes a patch having a seam disposed between the primary and secondary bags. The seam is configured to split when a pressure in the primary bag exceeds a threshold allowing gas to inflate the secondary bag.

An airbag module includes an airbag arrangement and an inflator configured to inflate the airbag arrangement. The airbag arrangement includes a primary bag, a secondary bag, and a patch. The patch partitions the primary and secondary bags. The patch includes a seam configured to tear in response to a pressure within the primary bag exceeding a threshold value to permit gas to enter the secondary bag from the primary bag.

A vehicle airbag system includes a steering wheel having a steering wheel cover and an airbag module. The airbag module includes an airbag arrangement and an inflator disposed behind the steering wheel cover. The arrangement defines a primary bag, a secondary bag, and a patch partitioning the primary and secondary bags. The patch includes a seam configured to tear in response to a pressure within the primary bag exceeding a threshold value to permit gas to enter the secondary bag from the primary bag.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Airbags aid in protecting vehicle occupants during an impact. Impacts may occur in many different ways. Impact forces cause a vehicle to accelerate and move. In the case of an oblique impact, the vehicle moves at an angle with respect to the occupant. Since the occupant inside a vehicle can be considered free floating, the occupant's body undergoes displacement relative to the moving vehicle. Different impacts displace vehicle occupants relative to the vehicle in different directions. This relative displacement of the occupant's body causes the occupant to move toward rigid front regions of the interior of the vehicle. As the occupant moves toward the rigid region, the airbag acts as an energy absorbing cushion. For example, an oblique impact—an impact at an angle of approximately 15° having approximately a 35% overlap—may cause a vehicle occupant, or more specifically a driver, to have a forward motion toward the window on the driver's side within the vehicle interior.

Figure 1:
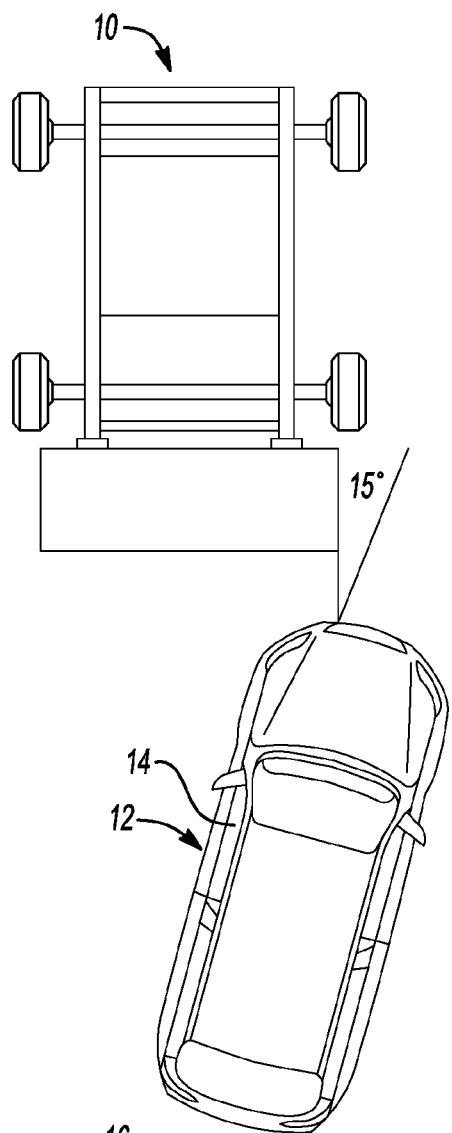
FIG. 1 is a top view of a vehicle about to experience an oblique impact.

Referring to FIG. 1, an oblique impact between vehicles is shown. A first vehicle 10 is shown impacting a second vehicle 12. The impact between the first vehicle 10 and the second vehicle 12 generates a force displacing a vehicle occupant. During an oblique impact, the vehicle generally moves at an angle with respect to the longitudinal axis of the vehicle. Since the occupant in the driver seat can be considered free floating (i.e. unaffected by the vehicle deceleration), the occupant moves toward the driver's side window 14 of the vehicle interior.

Figure 2:
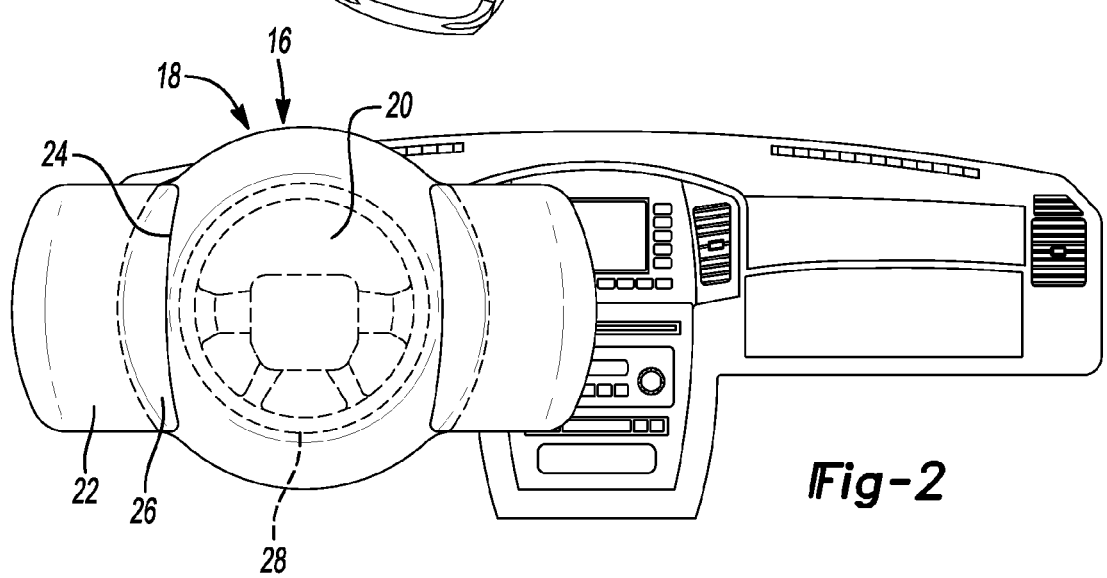
FIG. 2 is a front view of a deployed driver side airbag.

Referring to FIG. 2, a front view of an airbag module 16 used during an oblique impact is shown. The airbag module 16 comprises an airbag arrangement 18. The airbag arrangement 18 includes a primary bag 20, a secondary bag 22, and a patch 24. The primary bag 20 and the secondary bag 22 are partitioned by the patch 24. The primary bag 20 further includes a side 26. The secondary bag 22 is disposed on a side 26 of the primary airbag 20. The primary bag 20 and the secondary bag 22 are arranged in a way such that the primary bag 20 is configured to receive an occupant and the secondary bag 22 is configured to allow the airbag arrangement 18 to further catch an occupant after an oblique impact.

The airbag arrangement 18 may be formed with a single chamber. The single chamber design allows the airbag arrangement 18 to have various advantages. For example, the airbag arrangement 18 may be disposed behind a cover of a driver-side steering wheel 28. Therefore, due to the minimal volume of the secondary bag 22 and the traditional single chamber airbag inflation methods, the airbag arrangement 18 requires minimal adaptation to the existing steering wheel 28. This may save time, cost, and manufacturing expenses. Further, the secondary bag 22 may, for example, be approximately ⅓ of the volume defined by the primary bag 20. This allows the secondary bag 22 to have a stiffness and rigidity such that the secondary bag 22 further impedes an occupant's forward motion after an oblique impact.

Figure 3:
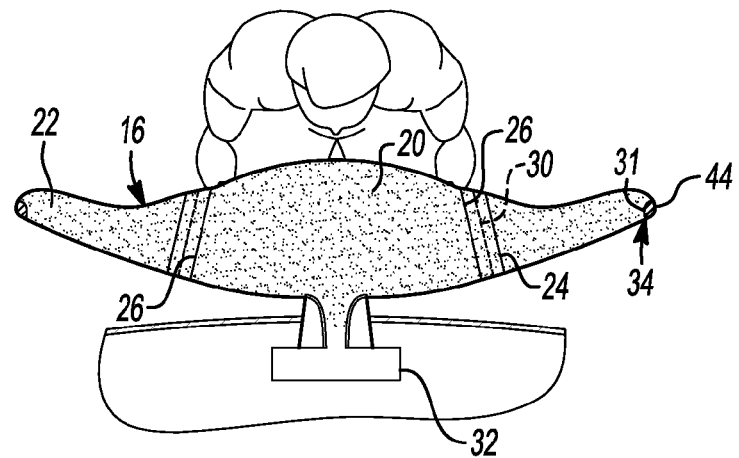
FIGS. 3 through 5 are top views of a vehicle occupant moving toward and into a deployed airbag arrangement during an oblique impact.
Figure 4:
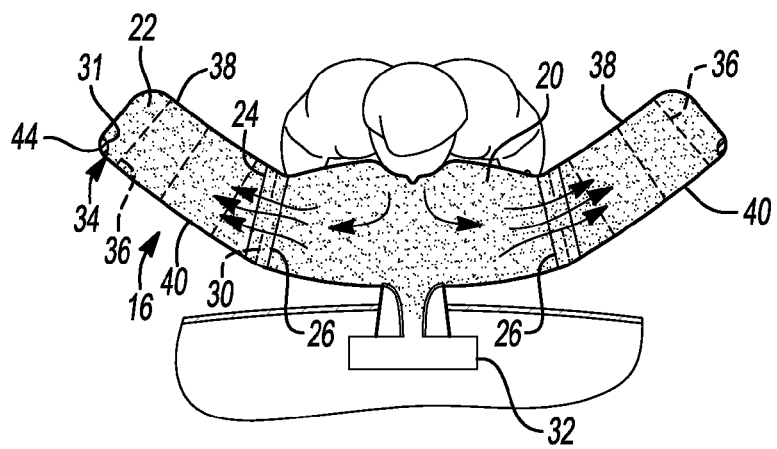
Figure 5:
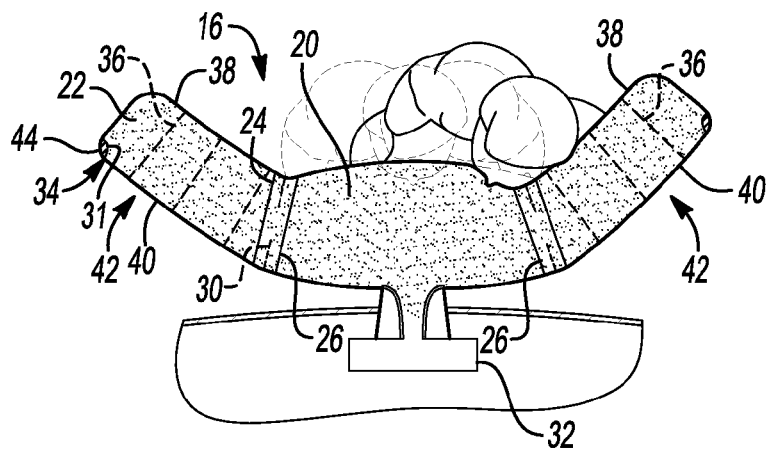

FIGS. 3, 4, and 5 depict a top view of the occupant's forward motion, after an oblique impact, into the airbag system 16. The primary bag 20 and the secondary 22 bag may simultaneously inflate, or the primary bag 20 may inflate either before or after the secondary bag 22. For example, the preferred embodiment allows for deployment of the primary bag 20 as a primary event and deployment of the secondary bag 22 as a secondary event. The timing of the airbag arrangement 18 deployment may be controlled using pressure within the airbag arrangement 18, as described below.

Referring to FIG. 3, a top view of the airbag module 16 immediately after an oblique impact event is shown. Upon impact, the occupant slides forward and contacts the primary bag 20. The secondary bag 22 is configured to further catch an occupant after an oblique impact. As the occupant begins to rotate, the secondary bag 22 inflates with a stiffness and rigidity such that it will further impede the occupant's forward motion across the primary bag 20. This allows the primary bag 20 to further cushion the occupant. The primary bag 20 and the secondary bag 22 are separated by the patch 24. The patch 24 acts as a partition dividing the primary bag 20 from the secondary bag 22.

The patch 24 further includes a seam 30 configured to inflate the secondary bag 22 upon achieving the desired optimal pressure within the primary bag 20. Once the optimal pressure within the primary bag 20 has been reached, the seam 30 tears splitting the patch 24. This allows the inflation gas to vent from the primary bag 20 to the secondary bag 22. When the seam 30 splits, the secondary bag 22 inflates. The patch 24 may be any material that splits upon application of pressure. Preferably, however, the patch 24 may be a fabric material. The seam 30 may be any device used to allow the inflation gas to pass through the patch 24. Preferably, however, the seam 30 may be formed through stitching. As described above, the timing of the airbag arrangement 18 deployment may be controlled using pressure. The patch 24 may be adapted to achieve optimal pressure within the primary bag 20.

For example, circumstances that require a more rigid primary bag 20 may use the patch 24 having a seam 30 adapted to withstand a higher pressure. Circumstances that require a less rigid primary bag 20 may use the patch 24 having a seam 30 adapted to split open under a lower pressure. The patch 24 and the seam 30 may be configured in a way such that the seam 30 tears upon achieving a pressure resulting from immediate inflation of the primary bag 20. This would cause the patch 24 to split at the seam 30 simultaneously with the inflation of the primary bag 20. Also, the patch 24 and the seam 30 may be configured in a way such that the seam 30 opens after the primary bag 20 has inflated. The pressure within the primary bag 20 determines when the seam 30 splits open. This allows for inflation of the primary bag 20 to be a primary event and inflation of the secondary bag 22 as a secondary event, once the pressure within the primary bag 20 has reached an optimal level to split the seam 30.

This allows the airbag module 16 to be adaptive. For example, upon detection of a full frontal collision, an inflator 32 may be used to inflate the primary bag 20 to a pressure that may not split the seam 30. Likewise upon detection of an oblique impact, the inflator 32 may be used to inflate the primary bag 20 to a pressure that tears the seam 30 and allows the inflation gas to vent through the patch 24 deploying the secondary bag 22.

Due to the small overall volume of the secondary bag 22, once the seam 30 splits the patch 24, the secondary bag 22 quickly inflates. This allows the airbag arrangement 18 to be used during a full frontal collision as well as an oblique impact event. Further, the single chamber design of the airbag arrangement 18 allows the airbag module 16 to use a traditional inflator 32.

Using a traditional inflator 32 has various advantages. For example, a traditional inflator 32 would not severely modify the airbag module 16. Therefore the airbag module 16 may not increase in packaging space, require further calibration, or need any additional adjustments found with a multiple inflator 32 designs. Using a traditional inflator 32 is merely the preferred embodiment. Other embodiments may include a multiple inflator 32 design in which one inflator 32 may inflate the primary bag 20 and an additional inflator 32 may inflate the secondary bag 22.

Further, an adaptive inflator 32 may also be used. The adaptive inflator 32 may be configured to inflate the primary bag 20 to a threshold pressure and upon detection of an oblique impact event, further inflate the primary bag 20 pressure exceeding a threshold pressure. Exceeding the threshold pressure in the primary bag 20 will open the seam 30 allowing the patch 24 to vent inflation gas into the secondary bag 22.

Referring to FIG. 4, a top view of an occupant being cushioned by the primary bag 20 is shown. The primary bag 20 is configured to cushion an occupant after an oblique impact. As the occupant slides forward, the occupant is initially cushioned by the primary bag 20. The pressure in the primary bag 20 is such that the primary bag 20 is configured to cushion an occupant. Therefore, the primary bag 20 should have a pressure sufficient to cushion an occupant after an oblique impact event.

In order to achieve an optimal pressure within the primary bag 20, the secondary bag may further include at least one vent 34. The vent 34 may be disposed anywhere on the secondary bag 22. The vent 34 is configured to vent the inflation gas away from the airbag arrangement 18 such that a peak inflated stiffness of the primary bag 20 is less than a peak inflated stiffness of the secondary bag 22. This allows the pressure and the stiffness of the primary bag 20 to be independently adjusted. For example, the vent 34 may include a tear seam 31. The tear seam 31 may be configured to tear when a certain pressure is exceeded in the secondary bag 22.

The vent 34 may also be defined by a hole. The vent 34 may be of an optimal size to achieve an optimal pressure within the secondary bag 22. For example, a large vent 34 may allow the inflation gas to immediately escape the secondary bag 22 upon inflation. Further, the larger vent 34 may be covered by a flap 44. The flap 44 may be a fabric covering similar to the material of the airbag arrangement 18 and attached to the secondary bag 22 via the tear seam 31. The flap 44 may be configured to vent inflation gas through the secondary bag 22 upon achieving a threshold pressure. A smaller vent 34 may not immediately allow the inflation gas to escape the secondary bag 22. Due to the higher pressure within the secondary bag 22 and the small size of the vent 34, the inflation gas may be delayed when vented through the secondary bag 22. Therefore, the pressure and the timing of inflation of the secondary bag 22 may be independently adjusted to achieve optimal settings. The vent 34 may have an optimal size to achieve an optimal pressure in the secondary 22 and the primary 20 bags.

After the occupant is received by the primary bag 20, the occupant's relative displacement causes the occupant to rotate and contact the secondary bag 22. The occupant will have a tendency to slide across the primary bag 20 and into the secondary bag 22. Extending from the side 26 of the primary bag 20, the secondary bag is configured to impede movement of the occupant's head as the occupant slides across primary bag 20. The secondary bag may be formed with a smaller volume allowing for a higher pressure which results in a higher stiffness and rigidity of the secondary bag 22. This allows the secondary bag to catch the occupant as the occupant begins to rotate toward the driver's side 14 of the vehicle interior. The secondary bag 22 acts as a barrier allowing the primary bag 20 to further cushion an occupant upon an oblique impact event.

Referring to FIG. 5, an occupant contacting the secondary bag 22 of the airbag arrangement 18 is shown. As the occupant slides across the primary bag 20 due to the forward motion relative to the vehicle generated by an oblique impact, the occupant will come in contact with the secondary bag 22. The secondary bag 22 has a rigidity and stiffness such that the secondary bag 22 is configured to catch an occupant allowing the primary bag 20 to further cushion the occupant after an oblique impact. When the occupant contacts the secondary bag 22, the rigidity and stiffness of the secondary bag 22 prevents the occupant's head from further sliding across the primary bag 20 and allows the primary bag 20 to further act as a pillow cushioning the occupant.

The secondary bag 22 may be formed using a plurality of tethers 36. The plurality of tethers 36 extend from a front 38 to a back 40 of the secondary bag 22. The plurality of tethers 36 forms the shape of the secondary bag 22. The plurality of tethers 36 may not be extensible. Therefore, the plurality of tethers 36 may be adjusted depending on the optimal desired shape and size of the secondary bag 22. The plurality of tethers 36 may be attached and extend through any part of the secondary bag 22 to achieve an optimal form to allow the primary bag 20 to further cushion occupant after an impact. The optimal shape of the secondary bag 22 is such that the secondary bag 22 acts as a barrier to catch an occupant into the primary bag 20.

The secondary bag 22 may be a thin chamber extending from the side 26 of the primary bag 20. The secondary bag may also be formed on another side 26 of the primary bag 20. For example, the secondary bag 22 may include at least two wings 42. One wing 42 may be formed on the side 26 of the primary bag 20 and another wing 42 may be formed on another side 26 of the primary bag 20. This allows the airbag arrangement 18 to be configured in a way such that the primary bag 20 is further configured to cushion an occupant after an oblique impact depending on where the impact occurs on the vehicle 12. Therefore, the airbag arrangement 18 may be symmetrical. The symmetry of the airbag arrangement 18 allows the airbag module 16 to be used during various impact events.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   a steering wheel including a steering wheel cover; and
   an airbag module including an airbag arrangement and an inflator disposed behind the steering wheel cover, the airbag arrangement having,
      a primary bag configured to cushion an occupant,
      a secondary bag disposed on a side of the primary bag adjacent to a driver's side of the vehicle and configured to catch the occupant during impact of the vehicle, wherein the secondary bag includes at least one vent arrangement defined by a flap covering an opening in the secondary bag and attached to the secondary bag via a tear seam configured to vent gas away from the airbag arrangement such that a peak inflated stiffness of the primary bag is less than a peak inflated stiffness of the secondary bag through splitting the tear seam and
      a patch having a seam disposed between the primary and secondary bags, wherein the seam is configured to split when a pressure in the primary bag exceeds a threshold to inflate the secondary bag.

2. The vehicle of claim 1 wherein a material of the patch is different than a material of the bags.

3. The vehicle of claim 1 wherein a shape of the secondary bag, when inflated, is at least partially defined by a plurality of tethers.

4. A steering wheel comprising:
   an airbag arrangement including
      primary and secondary bags, the secondary bag including a vent defining a flap covering an opening, attached thereto via a tear seam to vent gas from the arrangement, by splitting, such that a primary bag peak inflated stiffness is less than a secondary bag peak inflated stiffness, and
      a patch, partitioning the bags, including a seam for tearing when a primary bag pressure exceeds a threshold.

5. The steering wheel of claim 4 wherein the secondary bag defines a wing portion disposed on a side of the primary bag.

6. The steering wheel of claim 4 wherein a material of the patch is different than a material of the bags.

7. A vehicle airbag system comprising:
   a steering wheel including a steering wheel cover; and
   an airbag module including an airbag arrangement and an inflator disposed behind the steering wheel cover, the arrangement defining a primary bag, a secondary bag including at least one vent defined by a flap covering an opening in the secondary bag and attached to the secondary bag via a tear seam configured to vent gas away from the arrangement by splitting the tear seam such that a peak inflated stiffness of the primary bag is less than a peak inflated stiffness of the secondary bag, and a patch partitioning the primary and secondary bags, wherein the patch includes a seam configured to tear in response to a pressure within the primary bag exceeding a threshold value to permit gas to enter the secondary bag from the primary bag.

8. The vehicle airbag system of claim 7 wherein a shape of the secondary bag, when inflated, is at least partially defined by a plurality of tethers.

9. The vehicle airbag system of claim 7 wherein the secondary bag defines a wing portion disposed on a side of the primary bag.

* * * * *